(12) United States Patent  (10) Patent No.: US 7,551,199 B2
Bear et al.  (45) Date of Patent: Jun. 23, 2009

(54) COMPUTER CAMERA SYSTEM AND METHOD FOR REDUCING PARALLAX

(75) Inventors: Eric Gould Bear, Bellevue, WA (US);
 Chad Magendanz, Issaquah, WA (US);
 Aditha May Adams, Seattle, WA (US);
 Carl Ledbetter, Mercer Island, WA
 (US); Steve Kaneko, Medina, WA (US)

(73) Assignee: Microsoft Corporation, Redmond, WA (US)

( * ) Notice: Subject to any disclaimer, the term of this patent is extended or adjusted under 35 U.S.C. 154(b) by 922 days.

(21) Appl. No.: 10/429,943

(22) Filed: May 5, 2003

(65) Prior Publication Data

US 2004/0223061 A1    Nov. 11, 2004

(51) Int. Cl.
 *H04N 7/14* (2006.01)
 *H04N 5/225* (2006.01)
(52) U.S. Cl. .................. 348/207.1; 348/14.16
(58) Field of Classification Search ............. 348/14.01, 348/14.07, 14.16, 207.1, 207.11, 373–376
 See application file for complete search history.

(56) References Cited

U.S. PATENT DOCUMENTS

| | | | |
|---|---|---|---|
| 4,860,342 A | 8/1989 | Danner | |
| 5,159,445 A * | 10/1992 | Gitlin et al. | 348/14.01 |
| 5,412,417 A * | 5/1995 | Tozuka | 348/14.01 |
| 5,487,181 A | 1/1996 | Dailey | |
| 5,491,800 A | 2/1996 | Goldsmith | |
| 5,519,772 A | 5/1996 | Akman | |
| 5,533,115 A | 7/1996 | Hollenbach | |
| 5,546,538 A | 8/1996 | Cobbley | |
| 5,568,540 A | 10/1996 | Grecko | 379/88.25 |
| 5,657,414 A | 8/1997 | Lett | |
| 5,675,374 A * | 10/1997 | Kohda | 348/14.1 |
| 5,675,810 A | 10/1997 | Sellers | |
| 5,764,901 A | 6/1998 | Skarbo | |
| 5,768,164 A | 6/1998 | Hollon | |

(Continued)

FOREIGN PATENT DOCUMENTS

EP    0772327 A2    5/1997

(Continued)

OTHER PUBLICATIONS

U.S. Appl. No. 11/509,437, filed Aug. 23, 2006, Bear.

(Continued)

*Primary Examiner*—Timothy J Henn
(74) *Attorney, Agent, or Firm*—Workman Nydegger (57) ABSTRACT

A camera mounted on a computer system such as on a side of a monitor or behind a displayed image to reduce the parallax that results from a camera viewing angle that differs from a viewed party's viewing angle of a display, and that causes unnatural looking video communications. An item of interest corresponding to a focal point of the user that is being viewed, such as a counterpart displayed video image from a participant in the communication, may be positioned near the camera, such that the user tends to look in the general direction of the camera while communicating. Camera movement may be sensed to facilitate automatic or manual repositioning of the displayed item of interest, and a participant, such as a remote participant receiving video in a video communication may control the position of a displayed image on the monitor to minimize the parallax.

12 Claims, 10 Drawing Sheets

U.S. PATENT DOCUMENTS

| | | | |
|---|---|---|---|
| 5,802,305 A | 9/1998 | McKaughan | |
| 5,907,604 A | 5/1999 | Hsu | |
| 5,959,622 A | 9/1999 | Greer | |
| 5,991,836 A | 11/1999 | Renda | |
| 5,999,613 A | 12/1999 | Nabkel | |
| 6,006,285 A | 12/1999 | Jacobs | |
| 6,052,442 A | 4/2000 | Cooper et al. | 379/88.19 |
| 6,101,610 A | 8/2000 | Beebe | |
| 6,144,363 A | 11/2000 | Alloul | 345/618 |
| 6,144,644 A | 11/2000 | Bajzath et al. | 370/259 |
| 6,172,703 B1 * | 1/2001 | Lee | 348/14.08 |
| 6,208,373 B1 * | 3/2001 | Fong et al. | 348/14.16 |
| 6,215,420 B1 | 4/2001 | Harrison et al. | 341/22 |
| 6,237,846 B1 | 5/2001 | Lowell | |
| 6,240,168 B1 | 5/2001 | Stanford et al. | |
| 6,266,714 B1 | 7/2001 | Jacobs | |
| 6,279,056 B1 | 8/2001 | Jacobs | |
| 6,282,435 B1 | 8/2001 | Wagner et al. | 455/566 |
| 6,346,934 B1 | 2/2002 | Wugofski | 345/158 |
| 6,362,440 B1 | 3/2002 | Karidis | |
| 6,380,968 B1 | 4/2002 | Alexander | |
| 6,390,371 B1 | 5/2002 | Armga | |
| 6,417,849 B2 | 7/2002 | Lefebvre | |
| 6,438,216 B1 | 8/2002 | Aktas | |
| 6,438,585 B2 | 8/2002 | Mousseau | |
| 6,453,027 B1 | 9/2002 | Kang | |
| 6,483,905 B1 | 11/2002 | Kikinis | 379/93.24 |
| 6,484,019 B1 | 11/2002 | Aklian | |
| 6,496,860 B2 | 12/2002 | Ludtke | |
| 6,507,356 B1 * | 1/2003 | Jackel et al. | 348/14.06 |
| 6,513,128 B1 | 1/2003 | Wang | |
| 6,516,356 B1 | 2/2003 | Belknap | |
| 6,518,957 B1 | 2/2003 | Lehtinen et al. | |
| 6,519,335 B1 | 2/2003 | Bushnell | |
| 6,546,262 B1 | 4/2003 | Freadman | |
| 6,564,270 B1 | 5/2003 | Andert | |
| 6,603,855 B1 | 8/2003 | Cannon et al. | |
| 6,628,194 B1 | 9/2003 | Hellebust | 340/7.5 |
| 6,628,267 B2 | 9/2003 | Karidis | |
| 6,658,095 B1 | 12/2003 | Yoakum | |
| 6,671,356 B2 | 12/2003 | Lewis | 379/88.13 |
| 6,671,743 B1 | 12/2003 | Verity | 709/321 |
| 6,674,457 B1 | 1/2004 | Davies | |
| 6,680,845 B2 | 1/2004 | Agata | |
| 6,691,233 B1 | 2/2004 | Gannage | |
| 6,718,183 B1 | 4/2004 | Blust | |
| 6,731,316 B2 | 5/2004 | Herigstad et al. | 715/864 |
| 6,732,365 B2 | 5/2004 | Belknap | |
| 6,741,232 B1 | 5/2004 | Siedlikowski | 345/156 |
| 6,757,372 B1 | 6/2004 | Dunlap et al. | 379/142 |
| 6,806,867 B1 | 10/2004 | Arruda | |
| 6,816,881 B1 | 11/2004 | Mohindra | |
| 6,819,961 B2 | 11/2004 | Jacobs | |
| 6,831,657 B2 | 12/2004 | Tsutsumi et al. | 345/589 |
| 6,882,326 B2 | 4/2005 | Hirayama | 345/1.1 |
| 6,888,562 B2 * | 5/2005 | Rambo et al. | 348/14.16 |
| 6,892,074 B2 | 5/2005 | Tarkiainen | 455/466 |
| 6,897,851 B2 | 5/2005 | Carini | |
| 6,902,332 B2 | 6/2005 | McLoone | 400/472 |
| 6,912,283 B2 | 6/2005 | Meyerson et al. | 379/428.04 |
| 6,918,123 B1 | 7/2005 | Shteyn | |
| 6,937,950 B2 | 8/2005 | Cragun | |
| 6,938,174 B2 | 8/2005 | LeKuch | |
| 6,970,556 B2 | 11/2005 | Wall et al. | 379/355.01 |
| 6,973,167 B2 | 12/2005 | Kikinis | 379/67.1 |
| 6,976,216 B1 | 12/2005 | Peskin et al. | 715/716 |
| 6,980,641 B1 | 12/2005 | Stanford et al. | 379/387 |
| 6,996,445 B1 | 2/2006 | Kamijo | 700/94 |
| 7,000,237 B1 | 2/2006 | Sinha | |
| 7,036,110 B2 | 4/2006 | Jeyaraman | |
| 7,096,391 B2 | 8/2006 | Johnson | |
| 7,123,370 B2 | 10/2006 | Watanabe | |
| 7,221,331 B2 | 5/2007 | Bear | |
| 7,231,229 B1 | 6/2007 | Hawkins | |
| 7,243,130 B2 | 7/2007 | Horvitz | |
| 7,272,660 B1 | 9/2007 | Powers | |
| 7,292,588 B2 | 11/2007 | Milley | |
| 7,302,637 B1 | 11/2007 | Maguire | |
| 7,401,053 B2 | 7/2008 | Kamimura | |
| 2001/0040551 A1 | 11/2001 | Yates et al. | 345/156 |
| 2002/0004855 A1 | 1/2002 | Cox | |
| 2002/0015020 A1 | 2/2002 | Mobin | 345/156 |
| 2002/0080967 A1 | 6/2002 | Abdo | |
| 2002/0087225 A1 | 7/2002 | Howard | |
| 2002/0099456 A1 | 7/2002 | McLean | |
| 2002/0114430 A1 | 8/2002 | Murata | |
| 2002/0131072 A1 | 9/2002 | Jackson | |
| 2002/0167458 A1 | 11/2002 | Baudisch | |
| 2002/0167460 A1 | 11/2002 | Baudisch | |
| 2003/0021290 A1 | 1/2003 | Jones | 370/466 |
| 2003/0025674 A1 | 2/2003 | Watanabe | |
| 2003/0037180 A1 | 2/2003 | Madineni et al. | 709/321 |
| 2003/0046448 A1 | 3/2003 | Fischer | |
| 2003/0069689 A1 | 4/2003 | Ihara | |
| 2003/0074590 A1 | 4/2003 | Fogle | |
| 2003/0112325 A1 * | 6/2003 | Boyden et al. | 348/14.16 |
| 2003/0118003 A1 | 6/2003 | Geck | |
| 2003/0122874 A1 | 7/2003 | Dieberger | |
| 2003/0131148 A1 | 7/2003 | Kelley et al. | 717/101 |
| 2003/0146903 A1 | 8/2003 | Yi | |
| 2003/0188041 A1 | 10/2003 | Fillmore | |
| 2003/0197685 A1 | 10/2003 | Yi | |
| 2003/0227471 A1 | 12/2003 | Eglit | |
| 2004/0103144 A1 | 5/2004 | Sallam | |
| 2004/0114032 A1 * | 6/2004 | Kakii et al. | 348/14.08 |
| 2004/0135819 A1 | 7/2004 | Maa | |
| 2004/0141012 A1 | 7/2004 | Tootill | 345/827 |
| 2004/0155956 A1 * | 8/2004 | Libbey | 348/14.16 |
| 2004/0177361 A1 | 9/2004 | Bernhard et al. | 719/321 |
| 2004/0210628 A1 | 10/2004 | Inkinen | |
| 2004/0222977 A1 | 11/2004 | Bear | 340/815.4 |
| 2004/0222978 A1 | 11/2004 | Bear | 345/172 |
| 2004/0223058 A1 | 11/2004 | Richter | |
| 2004/0223061 A1 | 11/2004 | Bear | 348/207.1 |
| 2004/0223599 A1 | 11/2004 | Bear | 379/215.01 |
| 2004/0225502 A1 | 11/2004 | Bear | 704/270 |
| 2004/0225892 A1 | 11/2004 | Bear | 726/2 |
| 2004/0225901 A1 | 11/2004 | Bear | 713/300 |
| 2004/0240167 A1 | 12/2004 | Ledbetter et al. | 361/683 |
| 2004/0240650 A1 | 12/2004 | Bear | 455/426.1 |
| 2005/0068423 A1 | 3/2005 | Bear | 345/156 |
| 2005/0069101 A1 | 3/2005 | Bear | 379/90.01 |
| 2005/0071437 A1 | 3/2005 | Bear | 713/1 |
| 2005/0071626 A1 | 3/2005 | Bear | 713/1 |
| 2005/0182822 A1 | 8/2005 | Daniel | |
| 2005/0186942 A1 | 8/2005 | Griffin | |
| 2005/0193396 A1 | 9/2005 | Stafford-Fraser | |
| 2005/0259032 A1 | 11/2005 | Morris | |
| 2005/0262302 A1 | 11/2005 | Fuller | |
| 2006/0007051 A1 | 1/2006 | Bear | 345/1.1 |
| 2006/0048062 A1 | 3/2006 | Adamson | |
| 2006/0061516 A1 | 3/2006 | Campbell | |
| 2006/0095525 A1 | 5/2006 | Mousseau | |
| 2006/0130075 A1 | 6/2006 | Rhoten | 719/328 |
| 2006/0164324 A1 | 7/2006 | Polivy | 709/206 |
| 2006/0284787 A1 | 12/2006 | Bear | |

FOREIGN PATENT DOCUMENTS

| | | |
|---|---|---|
| EP | 0777394 A1 | 6/1997 |
| EP | 000816990 | 1/1998 |
| EP | 0838934 A1 | 4/1998 |
| EP | 0772327 A3 | 2/1999 |
| WO | WO9602049 A1 | 1/1996 |

WO 03/085960 10/2003

OTHER PUBLICATIONS

U.S. Appl. No. 11/559,821, filed Nov. 14, 2006, Bear.
U.S. Appl. No. 11/685,014, filed Mar. 12, 2007, Bear.
Anonymous, International Search Report in Corresponding EP Application No. EP 04 00 9868.
U.S. Appl. No. 11/837,302, filed Aug. 10, 2007, Bear.
Oxford On-line Dictionary, http://dictionary.oed.com/entrance.dtl, Oxford University Press 2007, on the definition of the word "physical" under III/7b.
Office Action dated Aug. 8, 2007 cited in related U.S. Appl. No. 10/996,371 (Copy Attached).
Office Action dated Jul. 31, 2007 cited in related U.S. Appl. No. 10/677,084 (Copy Attached).
Office Action dated Jul. 27, 2007 cited in related U.S. Appl. No. 10/996,557 (Copy Attached).
Office Action dated Jul. 30, 2007 cited in related U.S. Appl. No. 10/430,369 (Copy Attached).
Notice of Allowance dated Sep. 7, 2007 cited in related U.S. Appl. No. 10/429,931 (Copy Attached).
Office Action dated Sep. 24, 2007 cited in related U.S. Appl. No. 10/429,933 (Copy Attached).
Office Action dated Feb. 15, 2008 cited in related U.S. Appl. No. 10/429,933 (Copy Attached).
Notice of Allowance dated Jan. 30, 2008 cited in related U.S. Appl. No. 10/429,931 (Copy Attached).
Office Action dated Mar. 21, 2008 cited in related U.S. Appl. No. 10/966,557 (Copy Attached).
Office Action dated Feb. 28, 2008 cited in related U.S. Appl. No. 10/966,371 (Copy Attached).
Office Action dated Mar. 18, 2008 cited in related U.S. Appl. No. 10/677,118 (Copy Attached).
Office Action dated Oct. 15, 2007 cited in related U.S. Appl. No. 10/429,903 (Copy Attached).
Notice of Allowance dated Apr. 2, 2008 cited in related U.S. Appl. No. 10/429,903 (Copy Attached).
Notice of Allowance dated Apr. 23, 2008 cited in related U.S. Appl. No. 10/430,369 (Copy Attached).
Office Action dated Jan. 11, 2008 cited in related U.S. Appl. No. 10/677,084 (Copy Attached).
Notice of Allowance dated Apr. 29, 2008 cited in related U.S. Appl. No. 10/677,084 (Copy Attached).
Office Action dated May 15, 2008 cited in related U.S. Appl. No. 11/837,302 (Copy Attached).
Office Action dated Aug. 6, 2008 cited in U.S. Appl. No. 10/429,943. (Copy Attached).
Office Action dated Aug. 20, 2006 cited in U.S. Appl. No. 10/429,933 (Copy Attached).
Office Action dated Feb. 14, 2007 cited in U.S. Appl. No. 10/429,905 (Copy Attached).
Office Action dated May 21, 2007 cited in U.S. Appl. No. 10/429,905 (Copy Attached).
Office Action dated Apr. 4, 2006 cited in U.S. Appl. No. 10/429,930 (Copy Attached).
Office Action dated Jul. 14, 2006 cited in U.S. Appl. No. 10/429,930 (Copy Attached).
Office Action dated Nov. 14, 2006 cited in U.S. Appl. No. 10/429,930 (Copy Attached).
Notice of Allowance dated Mar. 16, 2007 cited in U.S. Appl. No. 10/429,930 (Copy Attached).
Office Action dated Aug. 9, 2005 cited in U.S. Appl. No. 10/429,932 (Copy Attached).
Office Action dated Oct. 4, 2005 cited in U.S. Appl. No. 10/429,932 (Copy Attached).
Office Action dated Mar. 17, 2006 cited in U.S. Appl. No. 10/429,932 (Copy Attached).
Office Action dated Aug. 15, 2006 cited in U.S. Appl. No. 10/429,932 (Copy Attached).
Notice of Allowance dated Jan. 25, 2007 cited in U.S. Appl. No. 10/429,932 (Copy Attached).
Office Action dated Mar. 16, 2006 cited in U.S. Appl. No. 10/677,101 (Copy Attached).
Office Action dated Sep. 6, 2006 cited in U.S. Appl. No. 10/677,101 (Copy Attached).
Notice of Allowance dated Feb. 2, 2006 cited in U.S. Appl. No. 10/677,101 (Copy Attached).
Office Action dated Mar. 26, 2007 cited in U.S. Appl. No. 10/429,931 (Copy Attached).
Office Action dated Sep. 26, 2006 cited in U.S. Appl. No. 10/430,369 (Copy Attached).
Office Action dated Mar. 20, 2007 cited in U.S. Appl. No. 10/430,369 (Copy Attached).
Office Action dated Jan. 3, 2007 cited in U.S. Appl. No. 10/429,903 (Copy Attached).
Office Action dated Nov. 1, 2006 cited in U.S. Appl. No. 10/677,084 (Copy Attached).
Office Action dated Jan. 19, 2006 cited in U.S. Appl. No. 10/677,084 (Copy Attached).
Office Action dated Mar. 6, 2007 cited in U.S. Appl. No. 10/429,933 (Copy Attached).
Office Action dated Aug. 10, 2005 cited in U.S. Appl. No. 10/677,084 (Copy Attached).
Office Action dated Oct. 15, 2008 cited in U.S. Appl. No. 11/509,437 (Copy Attached).
Office Action dated Oct. 20, 2008 cited in U.S. Appl. No. 11/509,431 (Copy Attached).
Office Action dated Nov. 6, 2008 cited in U.S. Appl. No. 10/996,557 (Copy Attached).
Office Action dated Oct. 1, 2008 cited in U.S. Appl. No. 10/996,371 (Copy Attached).
Office Action dated Nov. 28, 2008 cited in U.S. Appl. No. 10/677,118 (Copy Attached).
Office Action dated Jan. 2, 2009 cited in U.S. Appl. No. 11/837,302 (Copy Attached).
Office Action dated Feb. 20, 2009 cited in U.S. Appl. No. 11/053,186 (Copy Attached).
Office Action dated Feb. 19, 2009 cited in U.S. Appl. No. 10/996,558 (Copy Attached).

* cited by examiner

COMPUTER CAMERA SYSTEM AND METHOD FOR REDUCING PARALLAX

CROSS-REFERENCE TO RELATED APPLICATIONS

The present invention is related to the following co-pending United States Patent Applications filed concurrently herewith, assigned to the assignee of the present invention, and hereby incorporated by reference in their entireties:

"Method and System for Auxiliary Display of Information for a Computing Device," U.S. application Ser. No. 10/052,039, filed Jan. 17, 2002;

"Real-Time Communications Architecture and Methods for use with a Personal Computer System," U.S. application Ser. No. 10/429,905, filed May 5, 2003;

"Record Button on a Computer System," U.S. application Ser. No. 10/429,904, filed May 5, 2003;

"Method and System for Auxiliary Processing Of Information for a Computing Device," U.S. application Ser. No. 10/429,930, filed May 5, 2003;

"System and Method for Activating a Computer System," U.S. application Ser. No. 10/430,369, filed May 5, 2003;

"Computer System with Do Not Disturb System and Method," U.S. application Ser. No. 10/429,903, filed May 5, 2003;

"Control and Communications Panel for a Computer System," U.S. application Ser. No. 10/429,933, filed May 5, 2003; and "Notification Lights, Locations and Rules for a Computer System," U.S. application Ser. No. 10/429,931, filed May 5,2003.

FIELD OF THE INVENTION

The invention relates generally to video cameras and computer systems.

BACKGROUND OF THE INVENTION

Personal computers have evolved over time to accept various kinds of input. Video input via a camera is one such type of input that is becoming popular among users, such as for live video communication with another user. For example, with a reasonably high-bandwidth connection to the Internet and using a video camera connected to their personal computer, sometimes referred to as a webcam, users can hold Internet video conferences and make other video and voice calls over internet protocol (IP).

One of the difficulties with computer video cameras is making the video over IP experience seem natural. For example, variable frame rate and variable image size in conjunction with compression and other techniques help in reducing delay, jitter and other problems that otherwise make such communications seem unnatural.

Sometimes, however, the problems with providing a natural-looking presentation are not solely with the communications technology, but rather are with the way that the participants act or appear while on camera. For example, although it is understood by the participants that video calls are not necessarily like being in-person, users familiar with viewing live presentations and television productions in general expect a video communication to resemble something that is somewhat professionally produced. Cameras panning to nothing in particular, users looking distracted while on camera, and so forth, make the video experience less than it can be for users. Any improvement in the way that users present video to recipients to make the experience more natural for participants is thus desirable.

SUMMARY OF THE INVENTION

Briefly, the present invention provides a camera mounted on a computer system in a manner that decreases the parallax that causes an unnatural looking video communication. In one implementation, this is on the side of the monitor so that eyes are level with the camera, rather than looking down as with conventional top-mounted cameras. Further, the focal point of the user that is being viewed, such as the counterpart displayed video image from a participant in the communication, may be positioned near the camera, such that the user tends to look in the general direction of the camera while communicating.

At the time of installation of the video camera, the user may set the position of the received image that will be displayed during a video communication so as to be proximate the camera. Sensing of the camera being moved may result in the image being repositioned, either manually if the sensor is a simple yes/no movement sensor, or automatically if the sensor is able to detect the new camera location.

In one alternative embodiment, a participant receiving video in a video communication may control the position of a displayed image on another participant's monitor to minimize the perceived parallax. To this end, in addition to possibly controlling the sender's camera zoom, pan, focus and/or other effects from the recipient's end, the recipient can send data to the sender that effectively guides the eyes of the other party to a location that the recipient viewer prefers the other party to generally look towards. This may be a counterpart video image sent to the other party, a document on which both parties are collaborating, or some other item of interest.

Other advantages will become apparent from the following detailed description when taken in conjunction with the drawings, in which:

DETAILED DESCRIPTION

Exemplary Operating Environment

Figure 1:
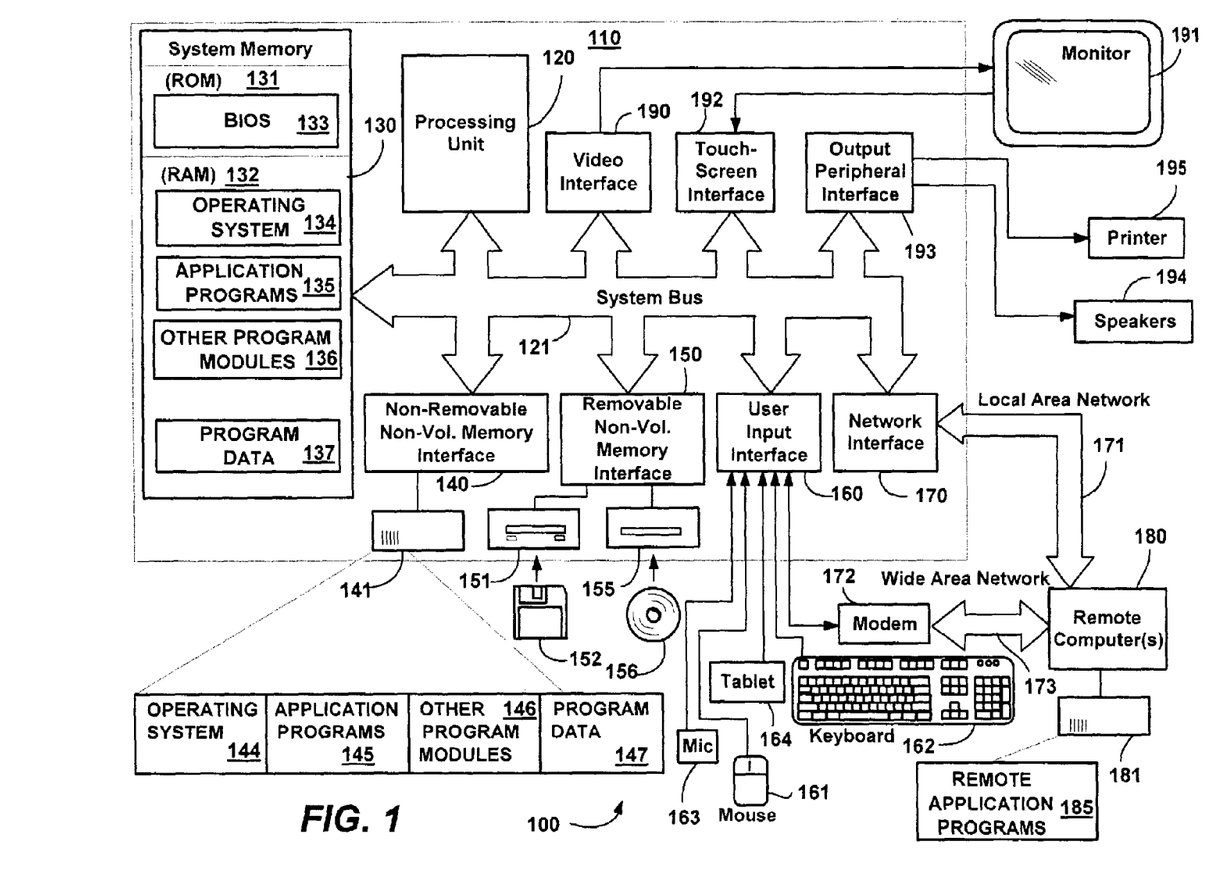
FIG. 1 is a block diagram generally representing a computer system into which the present invention may be incorporated.

FIG. 1 illustrates an example of a suitable computing system environment 100 on which the invention may be implemented. The computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

The invention is operational with numerous other general purpose or special purpose computing system environments or configurations. Examples of well known computing systems, environments, and/or configurations that may be suitable for use with the invention include, but are not limited to: personal computers, server computers, hand-held or laptop devices, tablet devices, multiprocessor systems, microprocessor-based systems, set top boxes, programmable consumer electronics, network PCs, minicomputers, mainframe computers, distributed computing environments that include any of the above systems or devices, and the like.

The invention may be described in the general context of computer-executable instructions, such as program modules, being executed by a computer. Generally, program modules include routines, programs, objects, components, data structures, and so forth, which perform particular tasks or implement particular abstract data types. The invention may also be practiced in distributed computing environments where tasks are performed by remote processing devices that are linked through a communications network. In a distributed computing environment, program modules may be located in local and/or remote computer storage media including memory storage devices.

With reference to FIG. 1, an exemplary system for implementing the invention includes a general purpose computing device in the form of a computer 110. Components of the computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

The computer 110 typically includes a variety of computer-readable media. Computer-readable media can be any available media that can be accessed by the computer 110 and includes both volatile and nonvolatile media, and removable and non-removable media. By way of example, and not limitation, computer-readable media may comprise computer storage media and communication media. Computer storage media includes volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by the computer 110. Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136 and program data 137.

The computer 110 may also include other removable/non-removable, volatile/nonvolatile computer storage media. By way of example only, FIG. 1 illustrates a hard disk drive 141 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media, discussed above and illustrated in FIG. 1, provide storage of computer-readable instructions, data structures, program modules and other data for the computer 110. In FIG. 1, for example, hard disk drive 141 is illustrated as storing operating system 144, application programs 145, other program modules 146 and program data 147. Note that these components can either be the same as or different from operating system 134, application programs 135, other program modules 136, and program data 137. Operating system 144, application programs 145, other program modules 146, and program data 147 are given different numbers herein to illustrate that, at a minimum, they are different copies. A user may enter commands and information into the computer 110 through input devices such as a tablet, or electronic digitizer, 164, a microphone 163, a keyboard 162 and pointing device 161, commonly referred to as mouse, trackball or touch pad. Other input devices not shown in FIG. 1 may include a joystick, game pad, satellite dish, scanner, or the like. These and other input devices are often connected to the processing unit 120 through a user input interface 160 that is coupled to the system bus, but may be connected by other interface and bus structures, such as a parallel port, game port or a universal serial bus (USB). A monitor 191 or other type of display device is also connected to the system bus 121 via an interface, such as a video interface 190. The monitor 191 may also be integrated with a touch-screen panel or the like. Note that the monitor and/or touch screen panel can be physically coupled to a housing in which the computing device 110 is incorporated, such as in a tablet-type personal computer. In addition, computers such as the computing device 110 may also include other peripheral output devices such as speakers 194 and printer 195, which may be connected through an output peripheral interface 193 or the like.

The computer 110 may operate in a networked environment using logical connections to one or more remote computers, such as a remote computer 180. The remote computer 180 may be a personal computer, a server, a router, a network PC, a peer device or other common network node, and typically includes many or all of the elements described above relative to the computer 110, although only a memory storage device 181 has been illustrated in FIG. 1. The logical connections depicted in FIG. 1 include a local area network (LAN) 171 and a wide area network (WAN) 173, but may also include other networks. Such networking environments are commonplace in offices, enterprise-wide computer networks, intranets and the Internet. For example, in the present invention, the computer system 110 may comprise source machine from which data is being migrated, and the remote computer 180 may comprise the destination machine. Note however that source and destination machines need not be connected by a network or any other means, but instead, data may be migrated via any media capable of being written by the source platform and read by the destination platform or platforms.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160 or other appropriate mechanism. In a networked environment, program modules depicted relative to the computer 110, or portions thereof, may be stored in the remote memory storage device. By way of example, and not limitation, FIG. 1 illustrates remote application programs 185 as residing on memory device 181. It will be appreciated that the network connections shown are exemplary and other means of establishing a communications link between the computers may be used.

Computer Camera for Reducing Parallax

The present invention is generally directed towards a computer camera mounted in a location that reduces the amount of parallax that is detected by a viewer receiving the camera image. One way in which this may be accomplished is to mount the camera at the eye level of the user being viewed, thereby appearing as if the party being viewed is on the same level as the viewer, rather than looking down below the viewer. The camera may be mounted to the monitor, or mounted near the monitor. Any suitable mounting mechanism may be used, such as a simple clamp to the side of the monitor that may be manipulated to allow vertical motion. Note that the present invention may be implemented with any input/output devices that exchange data, such as a video phone.

Further, the party being viewed will tend to look at an item of interest that is being displayed, and this item of interest may be moved on the display to further reduce parallax. For example, the user being viewed will tend to look at a counterpart video image received from another user, or at some other item of primary focus such as a document being edited in collaboration with another. By adjusting the position of this item of interest to a location proximate the camera, the parallax resulting from the user's eyes focusing on this item relative to the camera will be further reduced. Note that it would be essentially equivalent to move the camera to the item, however this would be far more costly considering that computer systems are already configured to position windows and other images on a display monitor. Further note that the various examples herein, such as with respect to matching the display to a camera position, are non-limiting examples, and that the present invention may be implemented in numerous ways.

Figure 2:
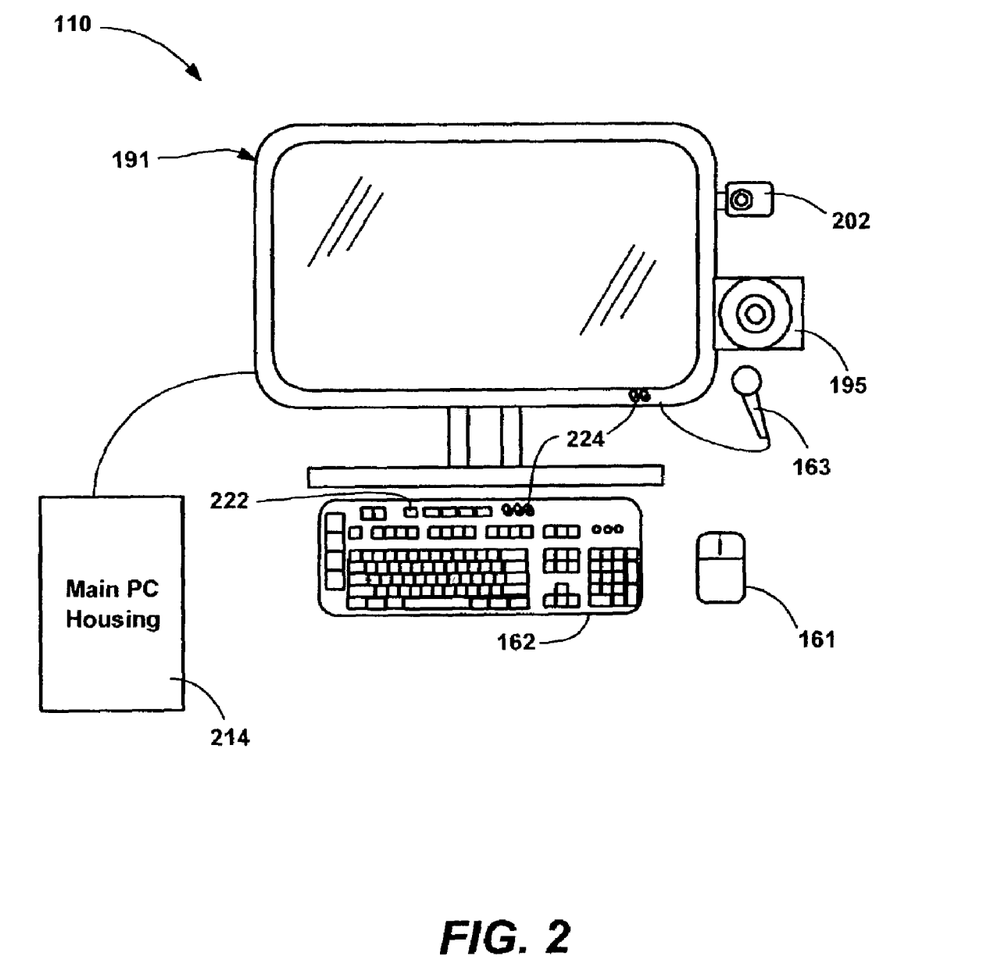
FIG. 2 is a general representation of a computer system arranged with a camera and monitor in accordance with an aspect of the present invention.

Turning to FIG. 2 of the drawings, there is shown a computer system, such as the computer system 110 of FIG. 1, into which the present invention may be incorporated to provide improved audiovisual communication. For example, the computer system 110 includes a monitor 191 which has an attached camera 202 for inputting video data, an attached speaker 194, and a microphone 163 which may serve as an audio input device. Any of the connections may be wired or wireless, whereby each of these devices and/or other devices may be considered part of a computer system, and if so, are connected directly or indirectly by a wired or wireless connection to interfaces at the main PC housing 214 (containing at least the processor and memory, but also typically containing some non-volatile storage).

Also represented in FIG. 2 are buttons or like controls 222, such as mounted on a keyboard, which may facilitate audiovisual communication. For example, a record button, camera control button and so on may allow users to control audiovisual input and output devices. Non-conventional indicators 224, such as at least one LED that is related to the state of recording and/or video transmission, also may be provided.

Figure 3:
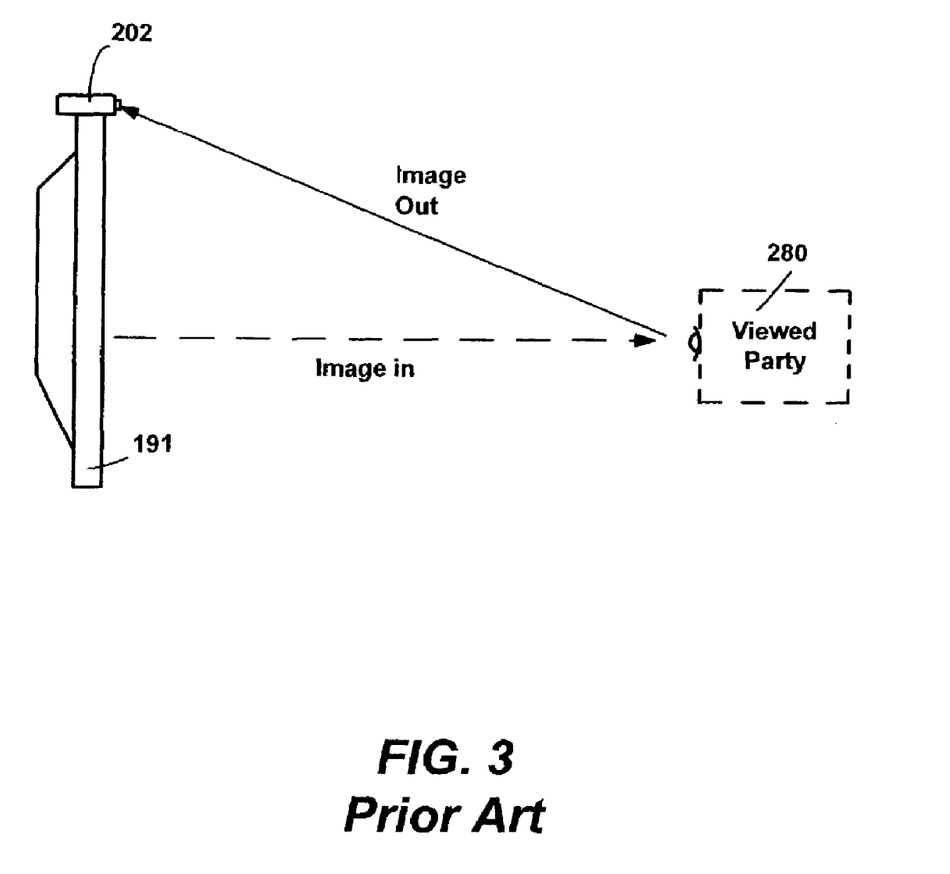
FIG. 3 is a generally front and above perspective representation of a camera mounted atop a monitor with a display positioned independent of the camera in accordance with the prior art leading to potentially significant parallax.

As generally represented in FIG. 3, cameras such as the camera 202 are top mounted on the monitor in the prior art, causing the image out to a receiving party (which may be a recorder or real-time viewer) as represented by the solid line being essentially upwards from the viewed party (or object) 280 to the top-mounted camera 202. Note that the direction of the lines are in the direction of photons traveling towards the viewer as in conventional optics. At the same time, the viewed party 280 is positioned (e.g., in eyes and generally vertical posture) to look at the monitor in an independent manner with respect to the camera, such as at the center of the display. This "image in" is represented by the dashed line, and causes undesirable parallax to the camera viewer. Note that the viewed party 280 is not necessarily a person, but may, for example, be an object that someone is holding up to the camera for viewing, angling it at the screen to point at the image coming in rather than to the camera since that is typically where the viewer appears to be looking for it (if not appearing to be looking even lower due to the same parallactic effect at the other end).

Figure 4:
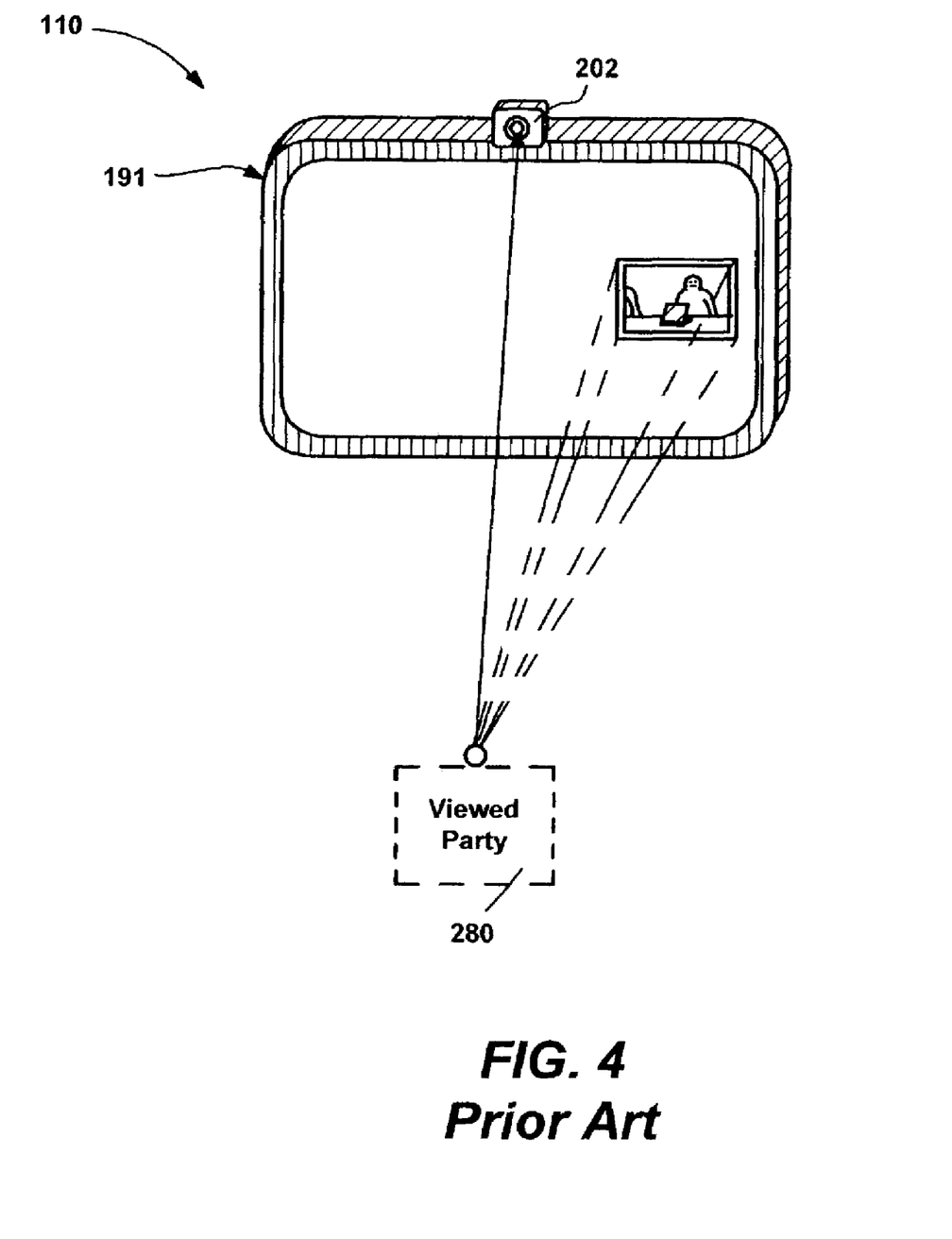
FIG. 4 is a side-view representation of a camera mounted atop a monitor with a display positioned independent of the camera in accordance with the prior art leading to potentially significant parallax.

FIG. 4 shows the same vertical viewing angle from a different perspective, and further showing that the horizontal viewing angle of the image may be different from the camera's viewing angle. Although possibly less unnatural than the amount of vertical parallax, the horizontal parallax also can be noticeable, giving a viewer the effect of the viewed party instead looking at someone (who may or may not be present) or something positioned to the side of the viewer.

Figure 5:
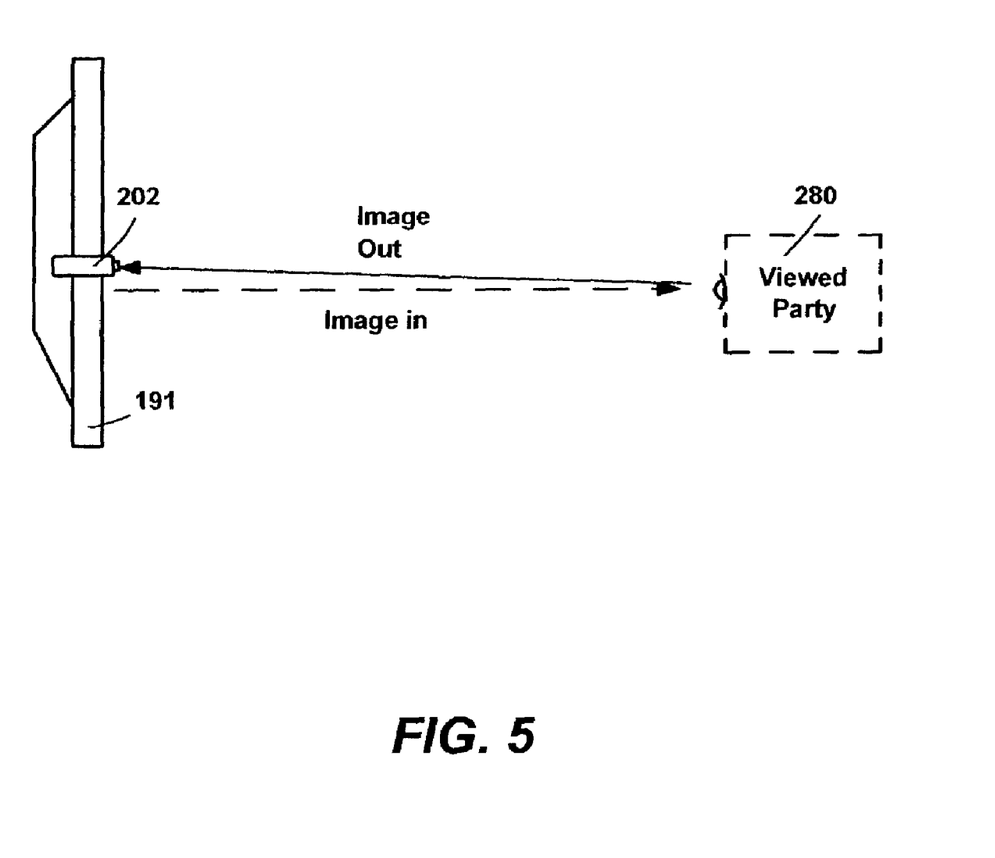
FIG. 5 is a generally front and above perspective representation of a camera mounted on the side of a monitor with a display positioned relative to the camera to reduce parallax in accordance with an aspect of the present invention.

In accordance with an aspect of the present invention, FIG. 5 shows a side-mounted camera, in which the viewing angle of the camera 202 (at least vertically) is substantially similar to the viewing angle of the image in. Note that they may be the same angle, at least part of the time, but are shown in FIG. 5 as being slightly different so that the solid line (representing the image out) does not obscure the dashed line (representing the image in). As can be readily appreciated, this side mounting substantially reduces the amount of vertical parallax.

Figure 6A:
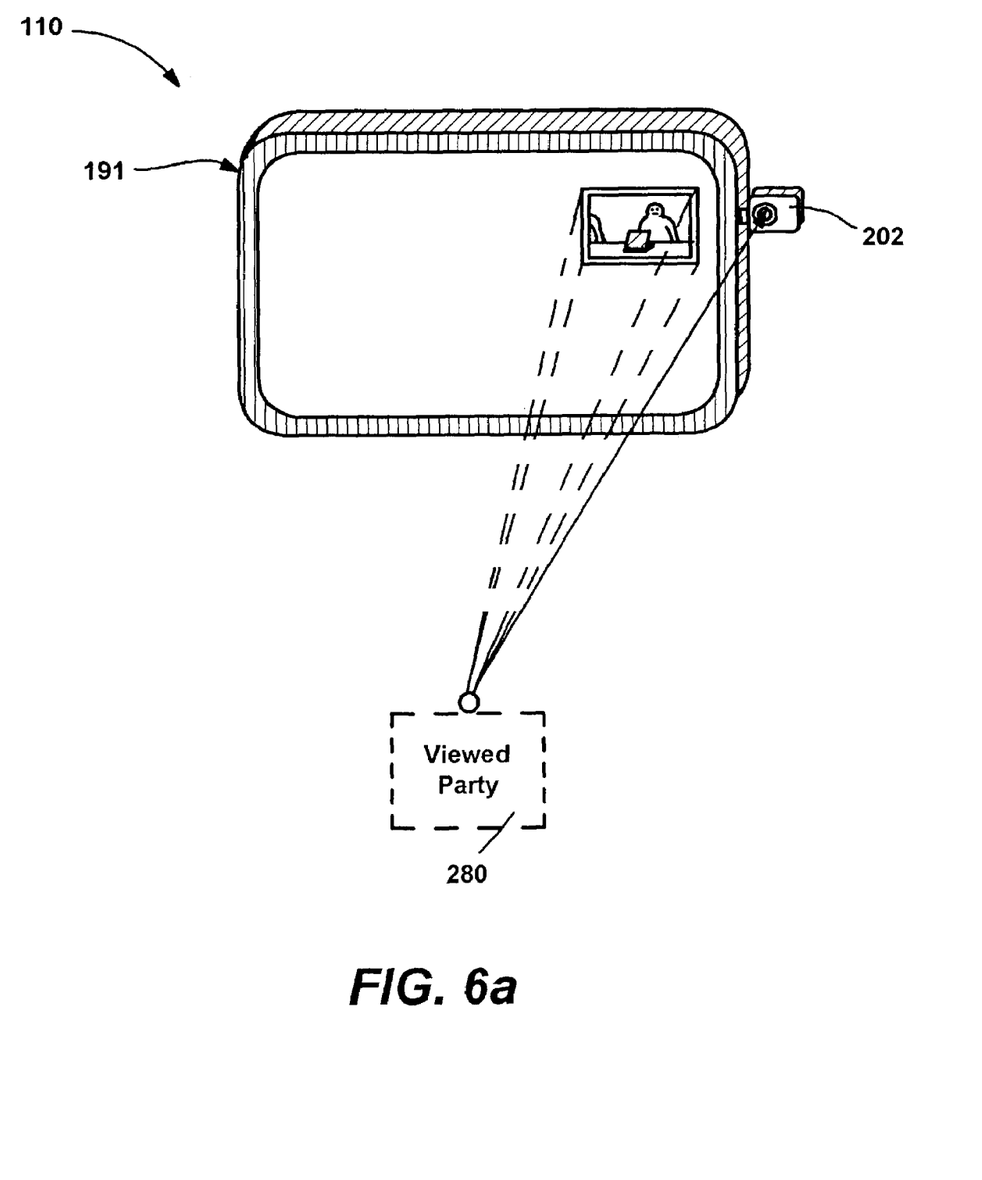
FIG. 6a is a side-view representation of a camera mounted on the side of a monitor with a display positioned relative to the camera to reduce parallax in accordance with an aspect of the present invention.

FIG. 6a shows the side mounted camera (on the right in contrast to the left in FIG. 5 to exemplify the many possible locations), and further showing a displayed point of interest (such as a counterpart received image) horizontally positioned proximate the camera 202 in accordance with another aspect of the present invention. Note that in FIG. 6a the camera 202 is shown as being a little above vertical center, to demonstrate that the parallax is still reduced relative to the top-mounted camera (or because this in fact may be eye-level to the viewed party 280). In any event, the item of interest to which the viewed party's eyes are typically focused is near the camera, reducing undesirable parallax.

Figure 6B:
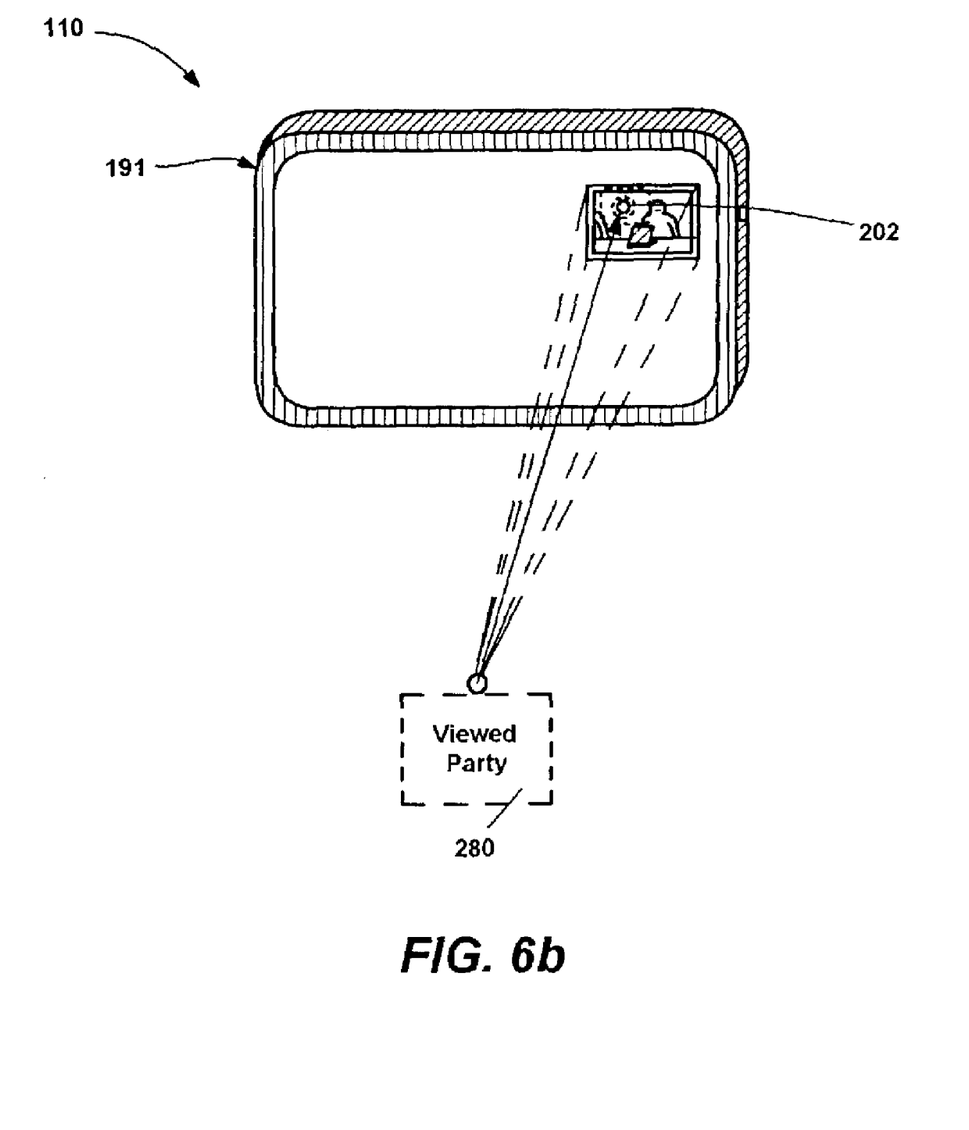
FIG. 6b is a side-view representation of a camera mounted on the side of a monitor with a display positioned relative to the camera to reduce parallax in accordance with an aspect of the present invention.

FIG. 6b shows another way of mounting the camera to further reduce parallax in which the camera 202 is essentially behind the screen such as behind the displayed image. In general, the basic construction of the display screen may include an LCD which is a backlight, a color filter, a polarizer, a matrix of liquid crystals and another polarizer. The light for a given pixel triplet passes through the filter layer (a matrix of red, blue and green pixel sized filters) through the first polarizer, through the liquid crystal layer where it is twisted or not either allowing the light through the final polarizer, or blocking it.

The present invention describes an LCD display constructed with a gap between the backlight and the display designed to contain a small fixed or movable camera mechanism, with the camera facing towards the display. While the backlight and the display are usually placed directly together, they are manufactured separately allowing the gap to be introduced at the assembly stage. To enable the camera to see through the display, the application or operating system controlling the camera will need to set the liquid crystals directly in front of the camera to allow light to pass through this section of the screen, this would be achieved by setting the small section of display in front of the camera to high intensity white. The camera will "look" through the color filters of the display giving an unprocessed image made up of pixels in the three primary colors. While this will decrease the apparent quality of the unprocessed image, standard imaging techniques can be used to combine the colors.

Using this method or similar, placing the camera behind the screen will allow the user to look at the section of the screen in which the caller is displayed, and for the camera to be positioned as close as possible to the image.

Figure 7:
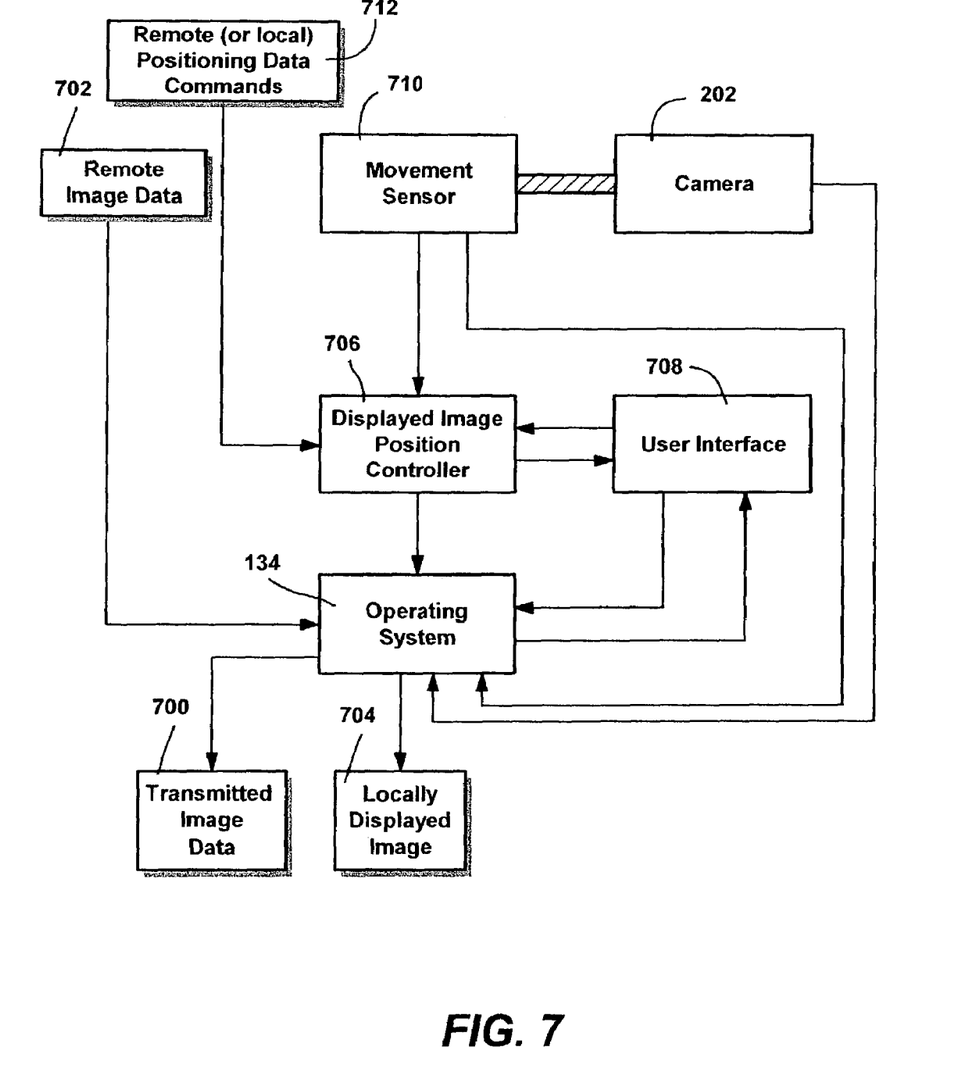
FIG. 7 is a block diagram generally representing components for positioning a displayed image relative to the camera to reduce parallax in accordance with an aspect of the present invention.

In accordance with another aspect of the present invention, the displayed item of interest is intentionally based on the camera's mounted position, thereby guiding the viewed party to look towards the camera. FIG. 7 represents general components for controlling this displayed item of interest so that transmitted image data sent from the camera 202 (e.g., over IP via the operating system 134 and/or the like) has a viewing angle that matches the item of interest. In the example of FIG. 7, the item of interest is a counterpart video image 702 received from a remote party to the video communication, but as described above, may be anything that is being displayed as a locally displayed image 704.

To move the displayed image to the camera, a displayed image position controller 706, which may include or be connected to a user interface 708, provides coordinates or like data to the operating system to position the locally displayed image 704, that is, the item of interest potentially causing the parallax. One or both of these components 706 and/or 708 may be part of the operating system 134, and, for example, may be invoked by right clicking on an application program window corresponding to the item of interest, e.g., along with move, size, minimize or maximize options may be a move-to-camera option.

Figure 8A:
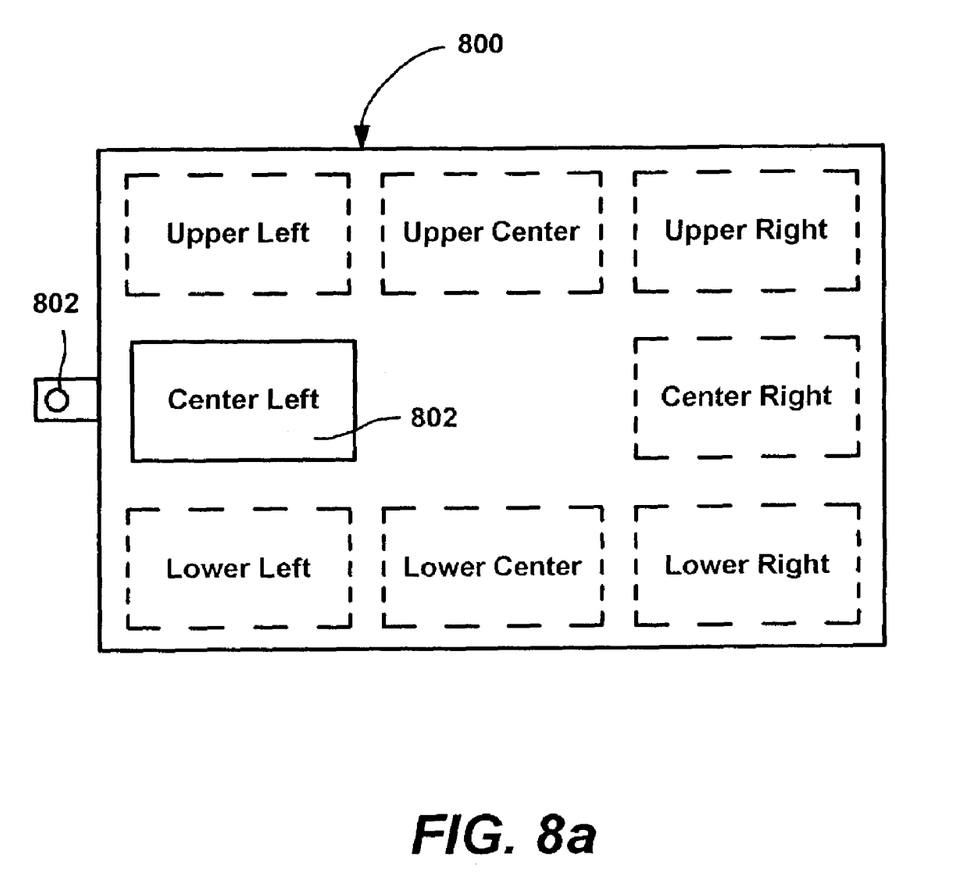
FIG. 8a is a representation of simplified positions a user or system can choose for displaying an image to reduce parallax in accordance with an aspect of the present invention.

FIG. 8a shows one such user interface 800, where the user may pick one position (or possibly two adjacent positions to split the difference) for the displayed item of interest to match to the actual camera position. Of course the user may drag an actual or simulated image to the actual position within a pixel resolution, for example, although less granular position data may be sufficient and desirable to an extent, such as if the position data had to be transmitted each time it changed when remotely controlling the image location. However, the user interface and/or move item to camera should be automatic to some extent so that the user need only set the position once if needed. In FIG. 8a the camera is shown at a center left position, which the user may thus select as an option 802. Note that although a side mounted camera is typically preferable so as to not look up or down at a viewed party, positions are provided that reduce parallax for top-mounted cameras and cameras below the monitor.

Figure 8B:
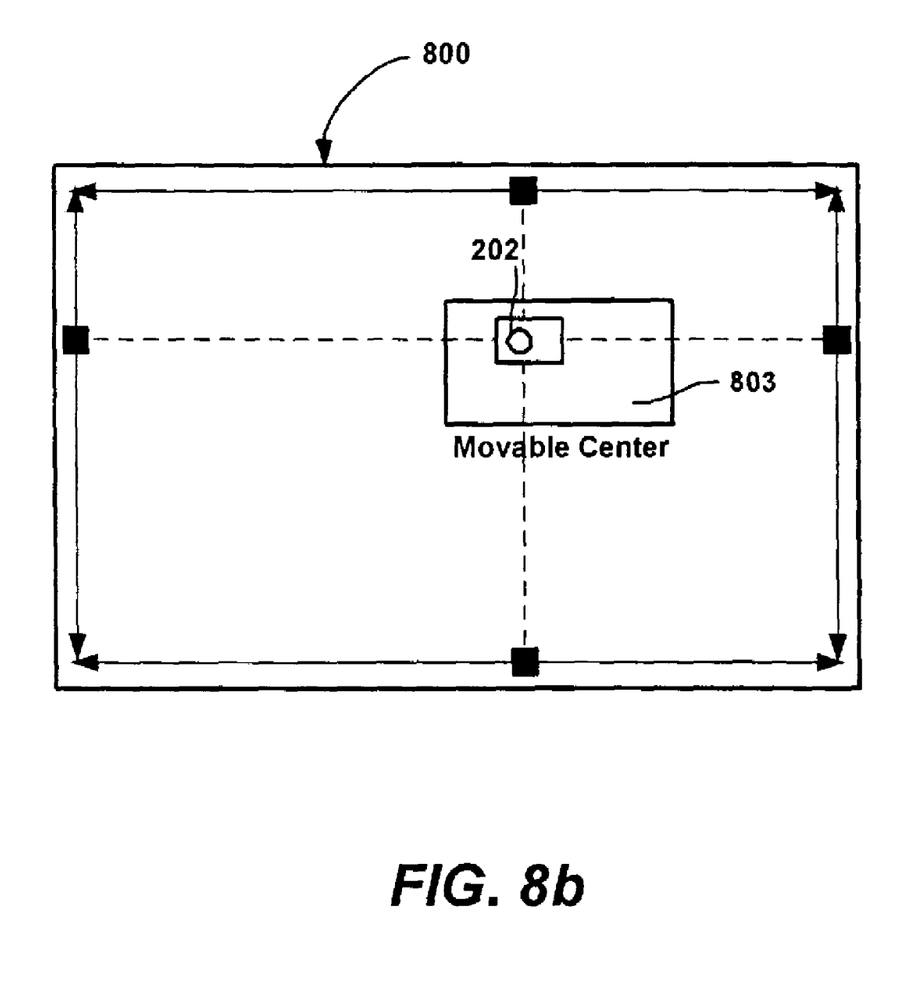
FIG. 8b is a representation of a camera position aligned with and behind an image to reduce parallax in accordance with an aspect of the present invention.

FIG. 8b shows the alignment of the camera behind the image as in FIG. 6b. The position selection may be automatic, or by the user.

Returning to FIG. 7, the camera 710 can be sensed if moved by a movement sensor 710. For example, a simple yes-no movement sensing switch (that may operate and retain a state change when the system is powered down until reset by the system) can signal the operating system 134 when the camera has moved, automatically triggering the display of the user interface 708 to give the user the opportunity to reselect the appropriate location for displaying items of interest with respect to the camera location. Alternatively, a more sophisticated movement sensor, (e.g. snap in slot connectors or continuous track for sliding that is used for mounting/connecting camera to monitor and to sense the position of camera), can provide the camera location to the displayed image position controller 706 so that the item of interest automatically moves with the camera.

In accordance with another aspect of the present invention, an inexpensive movement sensor may be the recipient of the camera transmission, (which may be the viewed party in a separate "view-self" window, or the remote viewer). Somewhat similar to the way a remote viewer can control a remote camera, (e.g., by sending panning commands over a video link), a remote viewer can provide positioning data 712 to the displayed image position controller 706 for controlling the location of the item of interest on the viewed party's display. A keyboard, mouse or other mechanism may be manipulated to generate such commands 712. Note that the user of the camera being viewed may override the various commands and produce whatever output is desired, whereby the commands are actually only requests. However the general concept is that a user typically will want to look more natural to viewers receiving the transmissions from the user's camera, and thus will accept such position data from the viewer and allow it to be used.

Further, note that the user may view what the camera is sending out, and may thus position that image to reduce parallax, particularly when guided to do so such as by the system. A keyboard, mouse or other mechanism may be manipulated to generate such positioning data commands. Once positioned, the user may replace the camera view with the item of interest (which may display a reduced size window with the camera view therein).

As can be seen from the foregoing detailed description, there is provided a method and system that match the viewing angle of a computer camera in a manner that reduces parallax, thereby providing a more natural viewing experience for users of audiovisual communications and the like. Vertical and horizontal components of parallax may be reduced, and various mechanisms may assist and/or automate the positioning of an item of interest relative to the camera location. The method and system thus provide significant advantages and benefits needed in contemporary computing and communications.

While the invention is susceptible to various modifications and alternative constructions, certain illustrated embodiments thereof are shown in the drawings and have been described above in detail. It should be understood, however, that there is no intention to limit the invention to the specific forms disclosed, but on the contrary, the intention is to cover all modifications, alternative constructions, and equivalents falling within the spirit and scope of the invention.

What is claimed is:

1. In a computing network in which a plurality of computing systems are interconnected so as to be able to digitally communicate among the computing systems, and wherein at least some of the computing systems are capable of communicating by means of digital video, a system adapted to decrease parallax in order to provide improved video imaging and communication, comprising:
    a computing system that includes a monitor that displays an image;
    a camera interconnected to the computing system, the camera producing an outgoing image for transmission to another, remote computing system;
    means for mounting the camera so that the camera is situated relative to a viewed party and relative to the incoming image on the monitor so that the camera and the incoming image are at substantially the same vertical height in order to decrease vertical parallax in the outgoing image produced by the camera; and
    means for positioning the incoming image on the monitor in response to received information corresponding to the incoming image and in response to a detected position of the camera in order to position the incoming image on the monitor at a location on the monitor that will reduce parallax of the outgoing image produced by the camera.

2. The system of claim 1 further comprising a mechanism that positions an item of interest on the display so as to further reduce parallax.

3. The system of claim 2 wherein the mechanism positions the item of interest on the display horizontally and vertically to further reduce the parallax.

4. The system of claim 2 wherein the mechanism that positions the item of interest moves the item of interest on the display horizontally to reduce horizontal parallax.

5. The system of claim 2 wherein the mechanism that positions the item of interest includes a user interface.

6. The system of claim 2 wherein the mechanism that positions the item of interest includes a camera movement sensor which automatically senses the location of the camera and provides camera location information to the means for positioning the incoming image.

7. The system of claim 2 wherein the mechanism that positions the item of interest positions the item of interest includes a camera location sensor.

8. The system of claim 2 wherein the mechanism that positions the item of interest includes a component for handling remote positioning data.

9. The system of claim 2 wherein the mechanism that positions the item of interest includes a component for handling local positioning data.

10. The system of claim 2 wherein the item of interest on the display comprises a video image received from a party viewing the camera image.

11. In a computing network in which a plurality of computing systems are interconnected so as to be able to digitally communicate among the computing systems, and wherein at least some of the computing systems are capable of communicating by means of digital video teleconferencing, an improved video conferencing system adapted to decrease parallax in order to provide improved video imaging and communication, comprising:
    a first computing system that includes a monitor with a display for receiving and displaying an incoming image on the monitor during video conferencing;
    a camera interconnected to the first computing system, the camera producing an outgoing image for transmission to another, remote computing system for display as the incoming image at that remote computing system during video conferencing;
    means for mounting the camera at a vertical and a horizontal location relative to the monitor;
    means for detecting at the first computing system interconnected to the camera information corresponding to the camera position;
    means for receiving information corresponding to an incoming image for display on the monitor of the first computing system; and
    means for positioning the incoming image on the monitor in response to the received information corresponding to the incoming image and in response to the detected position of the camera in order to position the incoming image on the monitor at a location on the monitor that will reduce parallax of the outgoing image produced by the camera.

12. The system of claim 11 wherein the means for positioning comprises means for aligning the camera behind the incoming image on the monitor.

* * * * *